US009248462B2

(12) United States Patent
Csaszar

(10) Patent No.: US 9,248,462 B2

(45) Date of Patent: Feb. 2, 2016

(54) AIRLESS PUMP SYSTEM

(75) Inventor: Edward F. Csaszar, Mountainside, NJ (US)

(73) Assignee: YONWOO CO., LTD., Incheon (KR)

( * ) Notice: Subject to any disclaimer, the term of this patent is extended or adjusted under 35 U.S.C. 154(b) by 0 days.

(21) Appl. No.: 13/308,630

(22) Filed: Dec. 1, 2011

(65) Prior Publication Data

US 2013/0140332 A1 Jun. 6, 2013

(51) Int. Cl.

| | |
|---|---|
| ***G01F 11/00*** | (2006.01) |
| ***B05B 11/00*** | (2006.01) |
| ***B67D 7/60*** | (2010.01) |
| *A45D 34/04* | (2006.01) |

(52) U.S. Cl.

CPC ......... *B05B 11/0048* (2013.01); *B05B 11/0008* (2013.01); *A45D 34/04* (2013.01); *A45D 34/041* (2013.01); *B05B 11/3001* (2013.01)

(58) Field of Classification Search

CPC ........................ B05B 11/0008; B05B 11/0048

USPC ........... 222/256, 340, 372, 380, 383.1, 383.3, 222/384–387

See application file for complete search history.

(56) References Cited

U.S. PATENT DOCUMENTS

| | | | | |
|---|---|---|---|---|
| 1,565,888 | A * | 12/1925 | Aussenhofer | 222/108 |
| 5,088,630 | A * | 2/1992 | Arch et al. | 222/326 |
| 6,332,561 | B1 * | 12/2001 | Garcia et al. | 222/321.3 |
| 6,685,062 | B1 * | 2/2004 | Ki | 222/321.7 |
| 6,776,309 | B2 * | 8/2004 | Schultz | 222/321.1 |
| 7,726,520 | B2 * | 6/2010 | Harrold | 222/162 |
| 7,891,522 | B2 * | 2/2011 | Law et al. | 222/1 |
| 7,934,626 | B2 * | 5/2011 | Choi et al. | 222/320 |
| 8,245,884 | B2 * | 8/2012 | Byeon | 222/256 |
| 2003/0102333 | A1 * | 6/2003 | Wright | 222/340 |
| 2008/0210711 | A1 * | 9/2008 | Riesle | 222/153.13 |
| 2010/0224652 | A1 * | 9/2010 | Lim | 222/256 |

FOREIGN PATENT DOCUMENTS

| | | | |
|---|---|---|---|
| DE | 3742733 | A1 * | 6/1989 |
| FR | 2692040 | A1 * | 12/1993 |
| WO | WO 2009109370 | A1 * | 9/2009 |

* cited by examiner

*Primary Examiner* — Frederick C Nicolas

*Assistant Examiner* — Matthew Lembo

(74) *Attorney, Agent, or Firm* — Marshall, Gerstein & Borun LLP

(57) ABSTRACT

Airless pump dispensers for various fluids are disclosed including an airless pump mounted in a housing, a movable piston mounted for moving within the housing starting at the bottom thereof, a dispenser at the top of the housing for receiving fluid from the airless pump and dispensing it, and a spring disposed at the bottom of the housing in contact with the bottom of the movable piston and having an insufficient driving force to independently move the movable piston within the housing when the housing contains the fluid.

15 Claims, 7 Drawing Sheets

AIRLESS PUMP SYSTEM

FIELD OF THE INVENTION

The present invention generally relates to airless pump dispensers. More particularly, the present invention relates to airless pump dispensers which are configured to deal with various external conditions.

BACKGROUND OF THE INVENTION

Airless pump dispensers have become extremely popular for a variety of reasons. Since they operate under a vacuum, they are particularly useful in connection with certain personal care products and pharmaceutical products, particularly those which can be degraded upon contact with air. These airless pump dispensers have also become more of a standard for use in the total evacuation of viscous products from their containers. In the past these viscous products have been packaged in jars or flexible tubes. The airless pump dispensers are thus preferred over these products due to the elimination of contamination of the product by the need to put your hand in the jar, and in order to maintain dispensing, and to provide virtually total product evacuation as compared to flexible tubes for example. In addition, the airless pump dispensers have a minimal number of moving parts, and have become extremely efficient in their operation.

In connection with these devices and in order to maintain an air-free environment, these devices generally either include a collapsible bag containing the fluid or other product being dispensed, or they include a movable piston within the container, which moves upwardly in order to enclose the material being dispensed in a decreasing volume as the material is being dispensed.

Among the various airless pumps which are used in these dispensing devices, a number are well known in the art and are commonly available on a commercial basis. As examples, reference is made to U.S. Pat. Nos. 6,685,062; 7,891,522; 7,934,626; and 6,332,561, the disclosures of which, particularly relating to the airless pumps themselves, are incorporated herein by reference thereto.

As a particular example, reference is made to U.S. Pat. No. 6,685,062, the entire disclosure of which is incorporated herein by reference thereto. In particular, in referring to FIG. 1 herein (corresponding to FIG. 3 of the ’062 patent), a preferred form of airless pump dispenser is shown. Thus, in this embodiment, a button 300 is vertically movable on the top of screw cap which is formed with a nozzle 400, a stent 600 connected to the lower part of button 300 communicating with the nozzle 400, a cylinder housing 1000 with a check valve 1400 in opening 1500 of the lower part of the housing. In this manner, when the button 300 is pressed, stem 600 is lowered along with piston 900 so that the contents of the cylinder housing 1000 are now put under pressure, and with the check valve 1400 closed. The contents of the cylinder housing 10' are then ejected through the channel in the stent 600 and nozzle 400. That is, with the piston 900 lowered, the openings 1100 are exposed within the cylinder housing 1000, and the fluid can enter the channel in stent 600 therethrough. With spring 800 compressed, release of the button 300 causes stem 600 to be raised by spring 800 resulting in a vacuum or reduced pressure in the cylinder housing 1000 so that the check valve is open to draw contents into the cylinder housing 1000 from the lower chamber of the container. At the same time, since the piston 900 has risen, the openings 1100 are again covered by sealing member 1200, so that fluid can no longer enter the channel in the stent 600.

There are other types of dispensing devices which include spring mechanisms in the lower portion thereof. For example, U.S. Pat. No. 5,685,456 discloses a spray dispensing system for liquids or particulates in which the reservoir chamber includes a collapsible enclosure. Thus, a shaped memory component or spring at the bottom of the container maintains constant delivery pressure for that material. Thus, this does not utilize an airless pump system, and the spring 24 shown in FIG. 1 thereof is specifically intended to pressurize the system.

In addition, U.S. Pat. No. 4,938,393 discloses yet another dispensing system in which the dispensed material is maintained without leakage when the package is subjected to external forces. In this device the valve 30 is in a closed position to prevent leakage, and during use the valve is moved into a position as shown in FIG. 7 of this patent, for example. This dispenser thus includes a bottom piston 70 which follows removal of the material from the device. In order to eject the material a downward force F is applied to pressurize the material in the container body so that, once again, the container means in the follow-up piston are forced against the interior bore to dispense the material. Upon withdrawal of the pressurizing piston 80, a void is created beneath the piston which creates a suction, thereby lifting surface 76. Once again, this is not a typical airless pump system, and the bands 70 at the bottom of the device are critical in dispensing the material from the container.

A problem encountered with conventional airless pump devices is that in order to operate properly the package must be filled with little or no headspace. Having such a space disposed at the top of the container would cause the customer to have to prime the pump by stroking the pump several times until the product is forced up by the piston and dispensed therethrough. Thus, particularly in connection with water-based products being utilized in these dispensers, a problem is created if the product freezes, such as during shipment or delivery. This causes the product to expand, pushing the pump out of the container or causing the container to crack or rupture. Thus, one of the objects of this invention is to solve this problem and to do so without creating any headspace in the package, which again would require priming by the customer.

BRIEF SUMMARY OF THE INVENTION

In accordance with the present invention, this and other objects have now been realized by the invention of an airless pump dispenser for a fluid comprising a housing having a top and a bottom, an airless pump mounted in an upper portion of the housing, a movable piston having a top and a bottom mounted for movement within the housing from a starting position proximate to the bottom of the housing, thereby defining a dispensing space for the fluid between the movable piston and the airless pump, and an end position proximate to the airless pump, a dispenser at the top of the housing for receiving the fluid from the airless pump and dispensing the fluid from the housing, and a spring member disposed at the bottom of the housing in contact with the bottom of the piston, the spring member having an insufficient driving force to independently move the movable piston within the housing when the housing contains the fluid. Preferably, the spring member comprises a helically coiled spring. In an alternate embodiment, the spring member comprises an accordion bellows.

In accordance with one embodiment of the airless pump dispenser of the present invention, the movable piston includes sealing means for airtight sealing with the inner surface of the housing.

In accordance with one embodiment of the airless pump dispenser of the present invention, the spring member is affixed to the bottom of the housing. Alternatively, the spring member can be affixed to the movable piston.

In accordance with another embodiment of the airless pump dispenser of the present invention, the movable piston includes sealing means for airtight sealing with the inner surface of the housing.

In accordance with a preferred embodiment of the airless pump dispenser of the present invention, the dispenser comprises a movable exit housing including a fluid exit for dispensing the fluid, the airless pump comprising an inlet for fluid connection to the housing containing the fluid, a one-way valve controlling the flow of the fluid through the inlet, a pump housing, a pump cylinder mounted within the housing, a pump piston slidably mounted within the pump cylinder, for slidable movement between an initial rest position and a dispensing position, the pump piston including an inner conduit for the fluid connected to the fluid conduit in the movable exit housing, whereby upon movement of the pump piston from the initial rest position to the dispensing position the fluid is dispensed through the inner conduit to the fluid exit in the movable exit housing, and upon return movement of the pump piston from the dispensing position to the initial rest position a vacuum is created to draw the fluid from the dispensing space through the one-way valve.

In accordance with another embodiment of the airless pump dispenser of the present invention, the pump piston includes at least one opening at the lower end of said pump piston, whereby the at least one opening is closed when the pump piston is in the initial rest position and is open when the pump piston is in the dispensing position, whereby the fluid can flow through the at least one opening into the inner conduit of the pump piston. In a preferred embodiment, the airless pump dispenser includes a sealing flap attached to the pump cylinder covering the at least one opening when the pump piston is in the initial rest position and uncovering the at least one opening when the pump piston is in the dispensing position.

In accordance with another embodiment of the airless pump dispenser of the present invention, the pump piston comprises a lower pump piston portion and an upper stem portion surrounding the lower pump piston portion, both of the lower pump piston portion and the upper stem portion including the inner conduit.

In accordance with another embodiment of the airless pump dispenser of the present invention, the dispenser includes a return spring disposed about the pump piston for returning the pump piston from the dispensing position to the initial rest position.

In accordance with another embodiment of the airless pump dispenser of the present invention, the movable piston includes an upper surface and a lower surface, the lower surface of the movable piston being in contact with the spring member, and the upper surface of the movable piston including an inner central depressed area whereby the inlet of the airless pump can be disposed in the inner depressed area.

In accordance with another embodiment of the airless pump dispenser of the present invention, the movable exit housing comprises a depressible cap and the fluid exit comprises a nozzle in the depressible cap. In another embodiment, the movable exit housing comprises an arcuate surface and the fluid exit comprises an opening in the arcuate surface. In yet another embodiment, the movable exit housing comprises a rotary ball having a predetermined diameter and a rotary ball housing including an opening having a diameter less than the predetermined diameter for retaining the rotary ball therein, and the fluid exit comprises the interface between the rotary ball and the rotary ball housing.

BRIEF DESCRIPTION OF THE DRAWINGS

The present invention may be more fully appreciated with reference to the following detailed description, which in turn refers to the drawings, in which.

DETAILED DESCRIPTION

The airless pump dispensers to which the present application is directed are dispensers for various liquid or semi-liquid compositions (generally referred to as "fluids," and thus including a large variety of flowable compositions), which are dispensed by drawing a vacuum with an airless pump upon depressing an activator of some type, generally disposed at the top of the dispenser, thus permitting the fluid to exit from a nozzle thereon. Thus, these airless pump dispensers act by the activation of a pump to eject product from a container in a specific dose by creating a vacuum within the container. As the pump evacuates product by creating a vacuum, a piston at the bottom of the container moves upwardly to equalize the force created by the vacuum so as to return the device to ambient atmospheric pressure before the next such activation.

Such airless pumps are currently primarily used in order to totally evacuate a product from the container. In a preferred embodiment, specific viscous products are dispensed thereby. In the past these types of viscous products were generally packaged in jars and flexible tubes. However, in these cases the total evacuation of product from the jar or flexible tube was difficult, if not impossible. In addition, the use of jars exposed the product to the air and potential contamination when using one's hands directly into the product. Since today's skin care products have become quite expensive, the need for total evacuation in an efficient way has become even greater.

Figure 2:
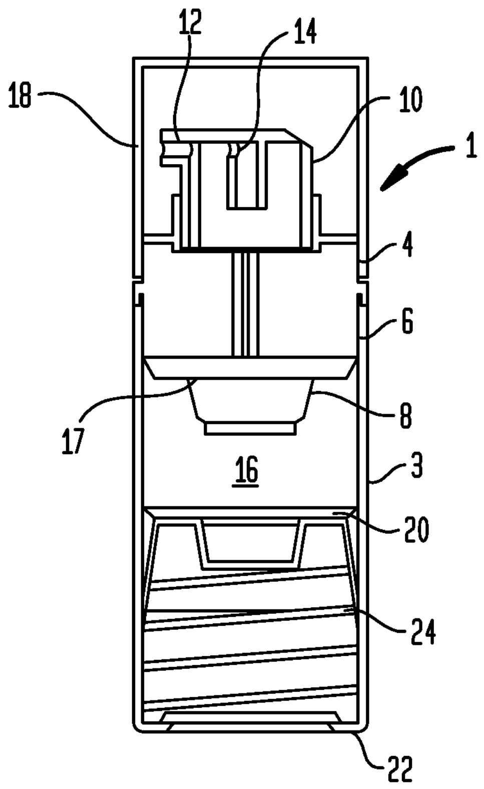
FIG. 2 is a side, elevational, sectional view of an airless pump dispenser in accordance with the present invention.

Turning to the Figures, in which like reference numerals refer to like elements thereof, FIG. 2 shows a sectional view of one airless pump dispenser in accordance with this invention. The dispenser 1 includes a main housing 3 in which the fluid to be dispensed is contained. Mounted in the housing or container 3 is an airless pump 4 which, as will be discussed below, can be one of a number of known airless pumps which are currently being utilized in this industry. The airless pump generally includes a pump body 6 which includes a lower inlet 8 connected to a cylinder 17 into which the fluid will pass in order to be dispensed. The upper portion of the airless pump includes an activator cap 10 which includes a nozzle 12. The activator cap 10 is thus activated by pressing downwardly on its upper surface 14 to actuate the airless pump 4, thereby forcing the fluid out of the cylinder 17 and through the nozzle 12. Upon return of the airless pump to its initial rest position, it will thus draw a vacuum within the housing 3 to draw fluid contained within that housing, such as at 16 through the inlet 8 and into the cylinder 17. The upper portion of the airless pump 1, including the actuator cap 10, is covered by a cap cover 18 when the airless pump dispenser is not in use. Thus, for actual use, the cover 18 is removed so that the upper surface 14 of the actuator cap 10 is exposed for actuation as discussed above.

Figure 1:
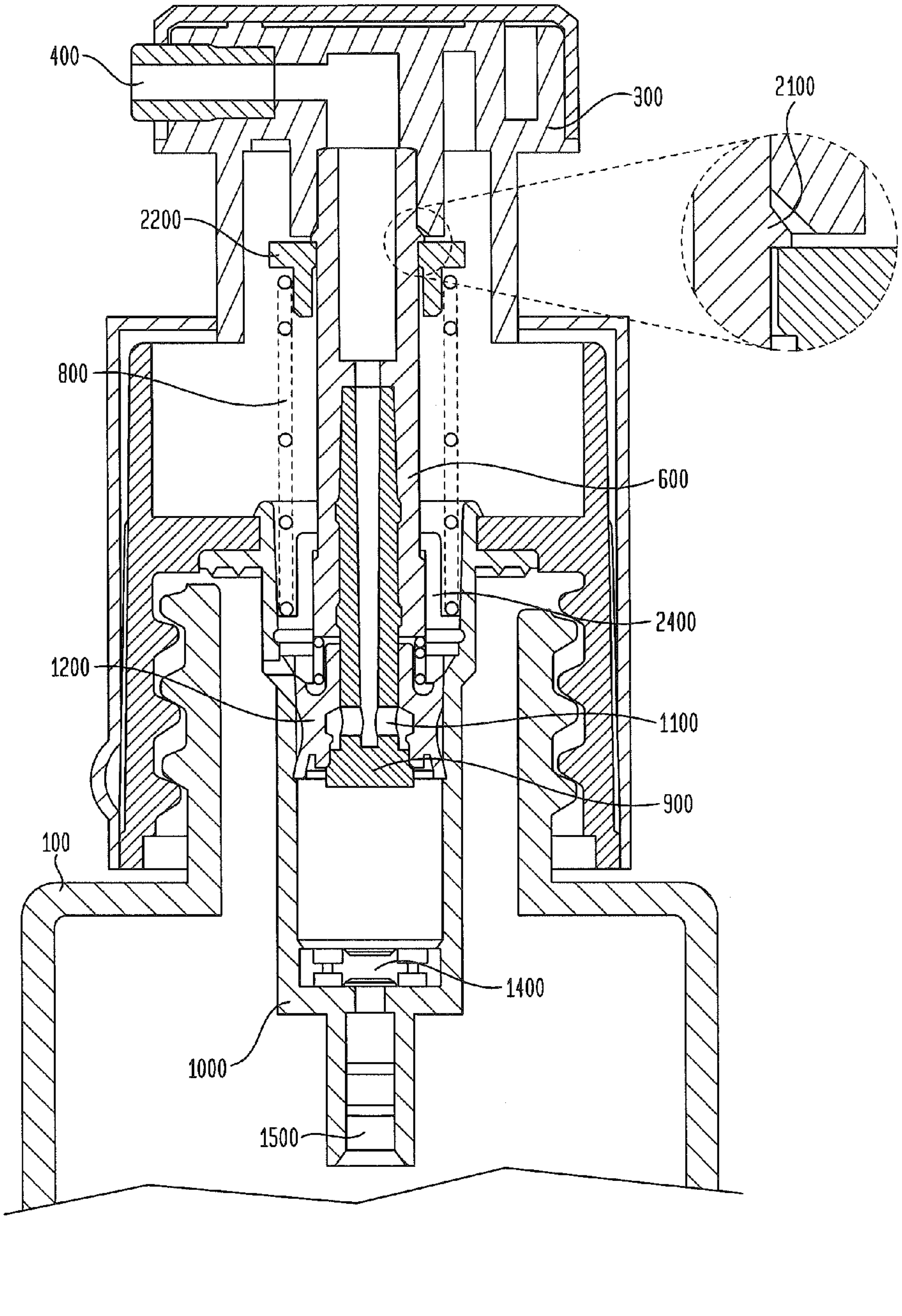
FIG. 1 (PRIOR ART)
FIG. 1 is a side, elevational, cross-sectional view of a portion of an airless pump dispenser in accordance with the prior art.

As further noted above, the elements of the airless pump dispenser which have been discussed above are generally conventional in nature, and can include the specific structure shown in FIG. 1. In accordance with the present invention, a piston 20 is slidably contained within the housing 3 for movement from the bottom of the housing 22 upwardly towards the airless pump 4. The piston 20 is not only slidably movable within the housing 3 but effects a seal against the inner surface of the housing 3. In order to accomplish this result, the piston is molded so as to have an interference fit with the inside wall of the container or housing 3. The piston thus has a wider diameter and is designed so as to create a flexible seal between the piston wall and the cylinder wall.

Figure 2A:
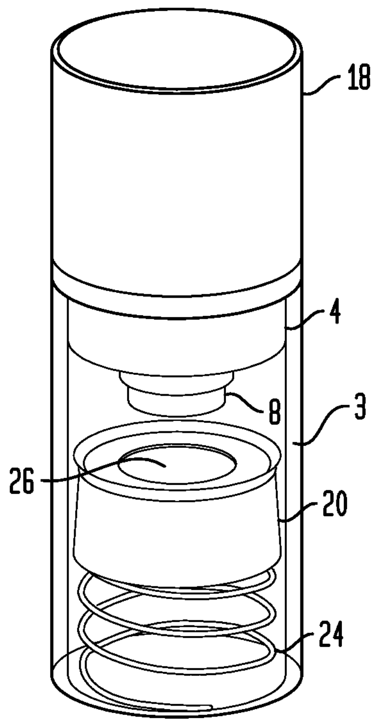
FIG. 2A is a side, partial view of a portion of the airless pump dispenser of the present invention.
Figure 2B:
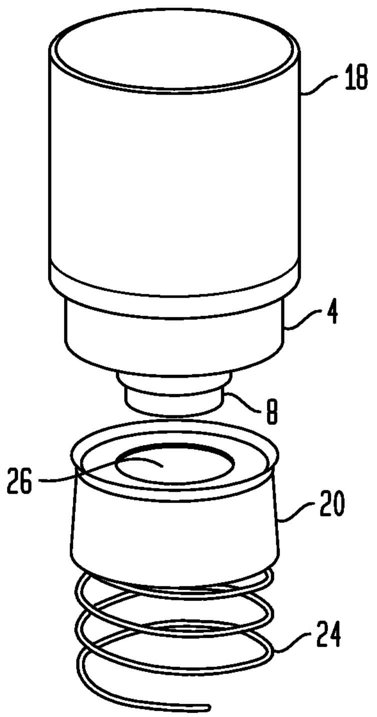
FIG. 2B is a side, elevational, exploded view of portions of the airless pump dispenser of the present invention.
Figure 3:
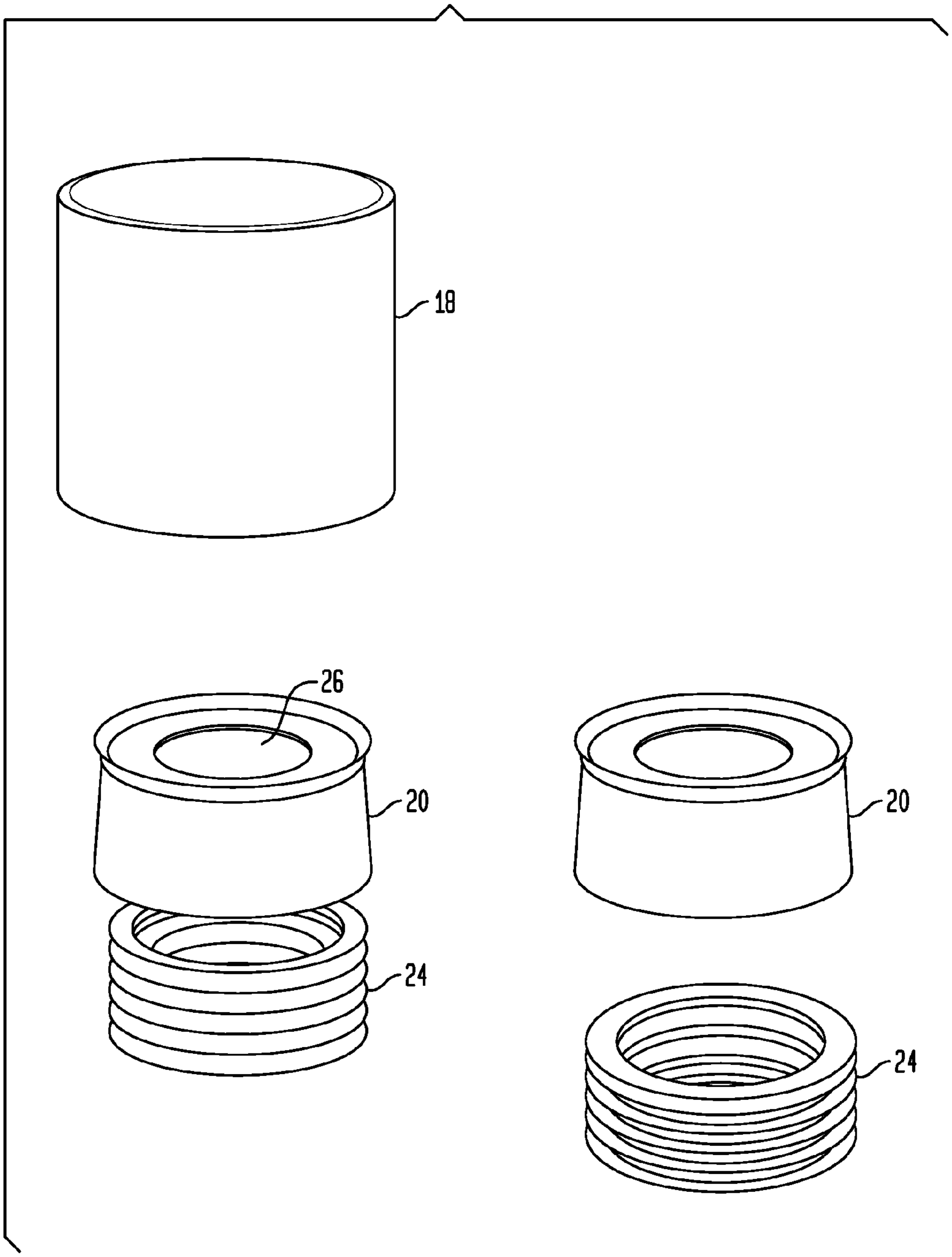
FIG. 3 is a partial, side, perspective view of portions of the airless pump dispenser of the present invention.

While such pistons are known in the art, in accordance with the present invention, a spring member 24 is disposed between the lower surface 22 of the housing 3 and the piston 20. Furthermore, the nature and spring force generated by spring member 24 is a critical part of the present invention. The spring member 24 cannot have a spring force which is sufficient to drive the piston 20 upwardly within the housing 3 against the fluid contained therein. In FIGS. 2A and 2B, while the movable piston 20 can move slidably within the housing 3, the spring member 24 is maintained below the piston 20. It should be appreciated that in conventional non-airless-type dispensers it is generally only possible to fill these containers to about 90% of their total capacity. The remaining 10% or so of that capacity is used to create an air space or "head space" which is intended to remain in the container to allow for possible expansion of product under conditions of extreme cooling or freezing. Thus, since water expands in volume as it moves from a liquid to a solid state, it exerts a pressure upon its surroundings by 790 mega Pascals of force, or about 114,000 pounds per square inch. By the nature of their design, airless containers are not required to have such head space for expansion. Thus, the spring member 24 has a specific physical characteristic so that it can absorb this expanding volume and force in order to protect the container from breaking under the conditions of product volume expansion discussed above. Of course, if the force of the spring is too great, it will not be able to overcome the forces created by expanding moisture, for example. On the other hand, if the force is too weak, it will not be able to raise the membrane after such expansion.

The problem of changes in the volume of the fluid contained within the housing 3 is generally only in existence when the container is full, such as when it is being shipped, or the like. Thus, the spring 24 is intended to perform its function most importantly at these early stages of use. When the container is thus full, any expansion in volume can be absorbed by the movable piston and the spring, which can then return the piston to its starting position. Thus, as the piston moves upwardly in the housing during use, it can eventually reach a position closer to the airless pump 4 when it might not necessarily be in contact with the spring 24. However, in order to prevent the spring from becoming loose or moving about within the housing 3 below the movable piston 20, it is preferred to attach the spring member 24 either to the base 22 of the housing 3, or to the bottom 20 of the movable piston itself, so that it moves upwardly therewith.

With the movable pistons 20 shown in FIGS. 2A and 2B, there is included an inner depressed portion 26 on the upper surface thereof. Thus, the inlet portion 8 of the airless pump 4 can fit snuggly within this inner depressed area upon ultimate movement of the movable piston 20 upwardly upon dispensing of essentially all of the fluid within the dispensing space 16 within the housing 3.

Figure 4:
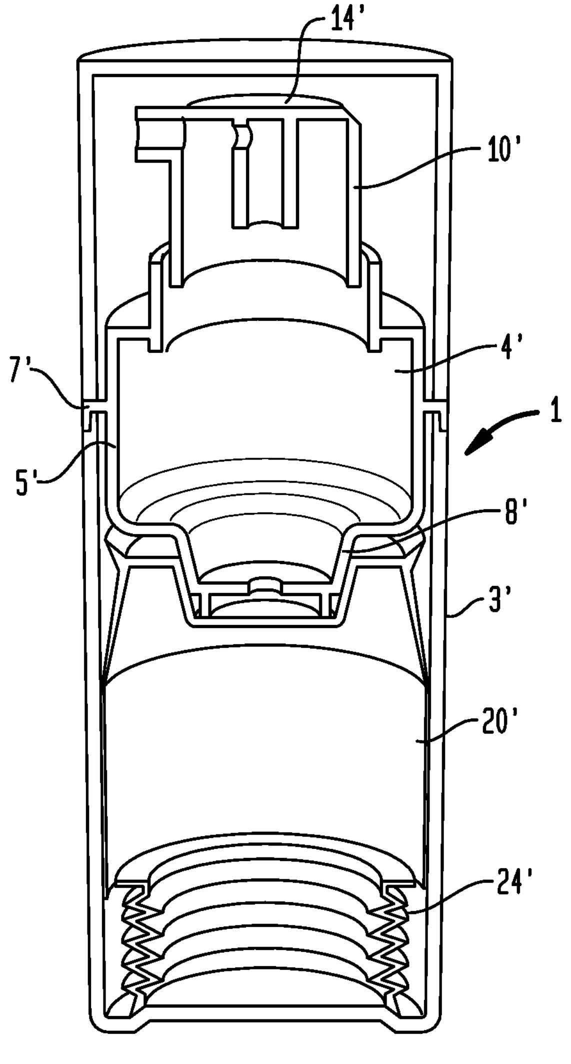
FIG. 4 is a partial, side, sectional view of an airless pump dispenser in accordance with the present invention.

Turning to FIG. 4, placement of the airless pump 4' itself within the airless pump dispenser 1 can be seen therein.

As shown in FIG. 4, the airless pump 4' is mounted within the housing 3' so that it can be covered by cap 10'. In general, the airless pump shown in FIG. 4 includes an inlet portion 8', and an actuator cap 10' including a nozzle 12'. As for the actual mounting of the airless pump 4' in the housing 3', the airless pump includes a pump housing 5' which forms the outer surface of the airless pump itself. The outer housing 5' can include an outer circular flange 7' which extends outwardly and downwardly from a central portion of the airless pump 4'. This flange can be snap-fit to the upper surface of the housing 3' itself, as shown in FIG. 4. This is a mechanical snap-on fitting for this purpose. As an alternative, however, as can be seen in the product shown in FIG. 1, it is possible for the airless pump to be mounted in a pump housing 5 as shown in FIG. 1 which includes screw threads 2 for threaded attachment to corresponding mating threads extending upwardly from the housing itself.

Figure 6A:
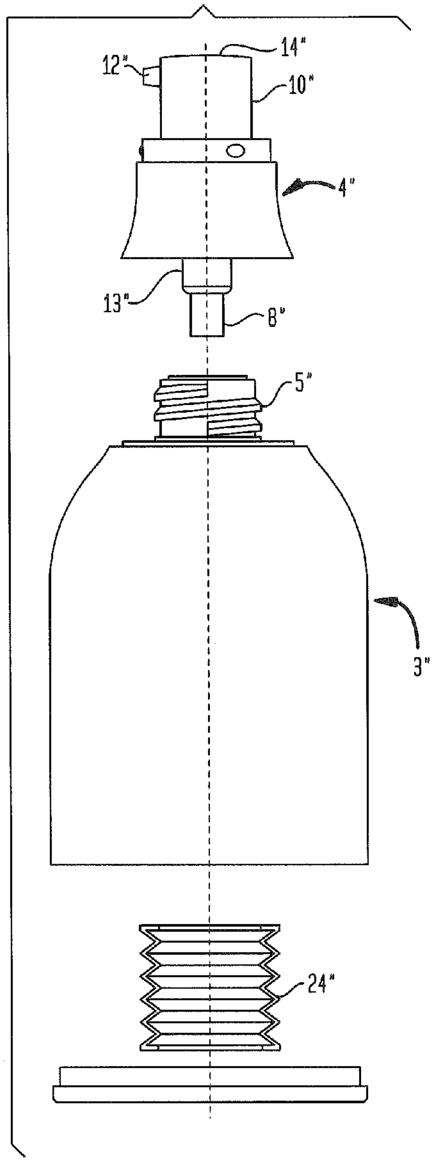
FIG. 6A is a partial, exploded, cross-sectional, elevational view of another airless pump dispenser in accordance with the present invention.

Turning to FIG. 6A, the airless pump 4" shown in this figure is similar to the airless pump system shown in FIG. 1. It is mounted on top of dispenser 3", in this case by threading, including threads 5" on the top of the dispenser 3" which are mateable with female thread portions 7" contained within the airless pump housing 4". We note in this embodiment that the dispenser housing 3" includes a double-walled configuration. Within the inner wall 9" is contained the movable piston 20". The spring mechanism used in this case is a bellows arrangement 24". The bellows 24" shown in FIG. 6A is affixed to the bottom of the housing 3". One end of the bellows is affixed to the bottom, and is in contact with but not attached to the bottom surface of the movable piston 20". Once again, this movable piston 20" is sealingly engaged with the inner wall of the housing 3" for slidable movement upwardly therein. Thus, much like the spring members discussed above, the contents of the initially filled housing 3" can undergo expansion under conditions such as freezing, thus pushing against the upper surface of the movable piston 20", allowing the bellows 24" to retract or collapse thereunder. However, upon removal of this increased volume, by thawing, for example, of the fluid contents, the memory of the bellows, such as a polymeric material, will permit the movable piston 20" to move back into its initial starting position, again preventing head space from being created within the container.

Figure 6B:
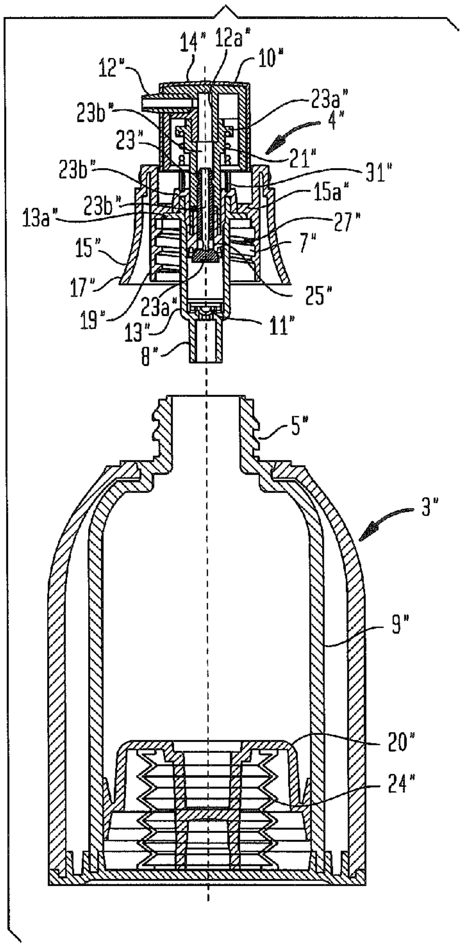
FIG. 6B is a partially exploded, elevational view of the airless pump dispenser shown in FIG. 8.

Turning again to the airless pump 4", in this case as can be seen in FIG. 6B, the inlet portion 8" includes a one-way valve 11" which is mounted just above the inlet portion 8". The valve 11" is mounted within the pump cylinder 13". Thus, the airless pump itself is mounted within a pump housing 15" which includes an outer wall 17" and an inner wall 19". The internal portion of the inner wall 19" thus includes the female threads 7" which are mateable with the male threads 5" on the top of the dispenser 3". Mounted within the pump housing 15" is the pump cylinder 13". The pump cylinder 13" is fixedly mounted to the inner wall 19" of the pump housing 15", by means of an extension 13*a*" which is attached to a flange 15*a*" extending inwardly from the pump housing 15". Within the pump cylinder 13" the pump piston 23" is mounted for slidable or reciprocating movement therein. The pump piston 23" is attached to and encased within the stem 21". Again, the pump piston 23" and the stem 21" are mounted for reciprocating movement downwardly from the position shown in FIG. 6B towards the valve 11". The upper end of the stem 21" is in turn affixed to the cap 10". In particular, a vertical passageway 12*a*" in the cap 10" extends downwardly and is connected horizontally to nozzle 12". Thus, in view of the existence of a central passageway 23*b*" within the pump piston 23" connecting with central passageway 21*b*" within the stem 23", as well as the upper passageway 12*a*" and the horizontal passageway in the nozzle 12", a direct passageway between the pump piston and the nozzle is created.

At the lower end of the pump piston 23" is located a solid tip 23*a*". Just above this tip are openings 25" horizontally formed in the pump piston 23". These openings 25" or inlet holes, in the initial rest position shown in FIG. 6, are covered by sealing member 24". The sealing member 24" is affixed to the pump cylinder 13" and does not move with the pump piston 23".

The pump piston 23" is activated by means of the cap 10", which is mounted reciprocally on the top of the airless pump itself. The pump piston 23" itself is generally prepared from a polymeric material such as a polyolefin. A material having a surface resilience and resistance to degradation from the product itself is thus preferred therefor. These materials also effectively create a circumferential seal around the cylinder 13" with a minimum of friction.

The pump piston 23" is moved downwardly by the application of pressure on the top surface 14" of the cap 10", such as by finger pressure thereon. This pressure exerted through both the stem 21" and the pump piston 23" moves the pump piston 23" downwardly within the cylinder 13" towards the valve 11". This, in turn, causes the inlet holes 25" to pass below the sealing members 24" thus exposing the inlet openings 25". In this manner, the fluid contained within the cylinder 13" is not only pressurized by the downwardly moving pump piston 23" but is then forced through the inlet hole 25" into the interior of the pump piston and the stem outwardly through the nozzle 12". Furthermore, the downward pressure created by the movement of the pump piston 23" keeps the valve 11" closed to further seal the cylinder 13".

A spring 31" for lifting the cap 10" is provided around the stem 23" externally of the cylinder housing 13". The spring 31" is elastically attached between an upper ring member 23*a*" fitted onto the stem 23" at its upper location and a lower ring member 23*b*" fitted onto the stem 23" at a location lower on the stem and upwardly of the pump piston 23", in order to urge these connections apart.

Therefore, when the pressure applied to the upper portion 14" of the cap 10" is released, the spring returns the pump piston 23" to its upward or initial rest position, from its dispensing position. This, in turn, creates a reduced pressure or vacuum within the cylinder 13". This causes the one-way valve 11" to open, drawing the contents of the fluid from the container 3" upwardly through the valve into the cylinder 13". The airless pump dispenser is then ready for further dispensing in the manner discussed above.

As for the valve 11" itself, as shown in FIG. 6B, it can comprise a butterfly check valve. However, it can comprise other types of one-way valves, such as ball valves and the like. Again, its sole function is to seal the passageway during the dispensing phase but to open the passageway when reduced or vacuum pressure is created as the pump is being restored to its initial rest position.

Figure 5:
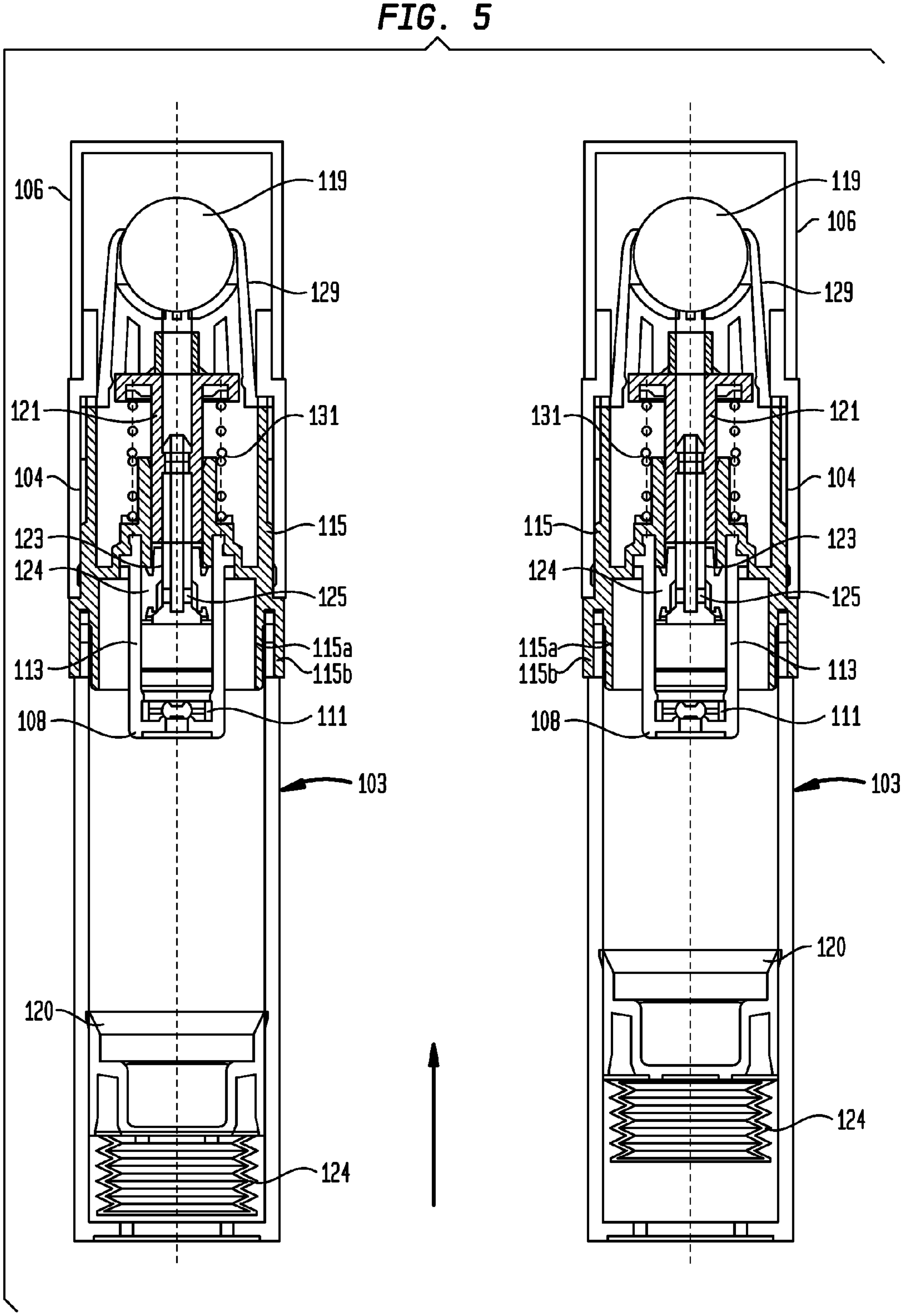
FIG. 5 is a side, elevational, sectional view of another airless pump dispenser in accordance with the present invention.

Turning to FIG. 5, another embodiment of the airless pump dispenser is shown therein. In this case, the container 103 includes a movable piston 120 initially at the bottom of the container 103 with the container filled with the fluid to be dispensed. Below the movable piston 120 and attached to its bottom surface is a bellows mechanism 124 much as discussed above. The airless pump 104 is mounted at the upper end of the container 103 and includes much the same mechanism as discussed above. Thus, the inlet opening 108 includes a one-way valve 111 into the cylinder 113 mounted therein. The cylinder 113, in turn, is mounted to the pump housing 115 which is firmly mounted to the top of the container 113 by means of parallel arms 115*a* and 115*b* extending downwardly therefrom. The pump piston 123 is mounted for reciprocal movement within the cylinder 113, and is again attached to the stem 121 and includes internal passageways corresponding thereto. In this case, however, at the top of the airless pump, and above the extension of the stem 121, a dispensing ball 119 is mounted. The dispensing ball 119 has a diameter which is greater than the diameter created by the dispensing ball holder 129 mounted at the top of the airless pump. The dispensing ball 119 is thus rotatable in the position shown. By pressure created on the top of the dispensing ball 119, such as by pressing it against one's skin, the combination of stem 121 and pump piston 123 is moved downwardly against the force of the spring 131, and the lower end of the pump piston 123 includes horizontal passageway 125 which is normally covered by sealing member 124. However, downward movement of the pump piston 123 opens the horizontal passageway 125 from the sealing member 124, moving it into the lower portion of the cylinder 113 for exposure to the pressurized fluid created therein, again by movement of the pump piston 123 downwardly. This causes the fluid to enter the horizontal passageway 125 and through the internal passageways of the pump piston 123 and the stem 121 directly onto the rotating ball 119 for dispensing thereon. Once again, the spring 131 is attached to the stem 121 for return movement of the pump piston 123 and the stem 121 after release of pressure on the rotating ball 119. This again causes the pump piston 123 to move upwardly, creating a reduced pressure or vacuum within the cylinder 113, thus opening the one-way valve 111 and causing additional fluid to move into the cylinder 113. This, in turn, causes the movable piston 120 to move upwardly as in the right-hand figure in FIG. 5, eventually drawing the bellows 124 with it. A cover 106 is also provided to close the container 103 during nonuse and to protect the rotating ball itself.

Figure 7A:
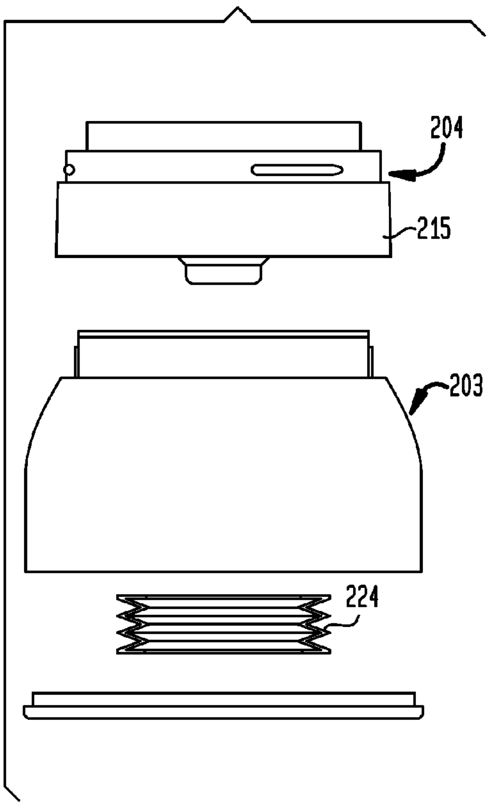
FIG. 7A is a partial, side, elevational, sectional view of another airless pump dispenser in accordance with the present invention.
Figure 7B:
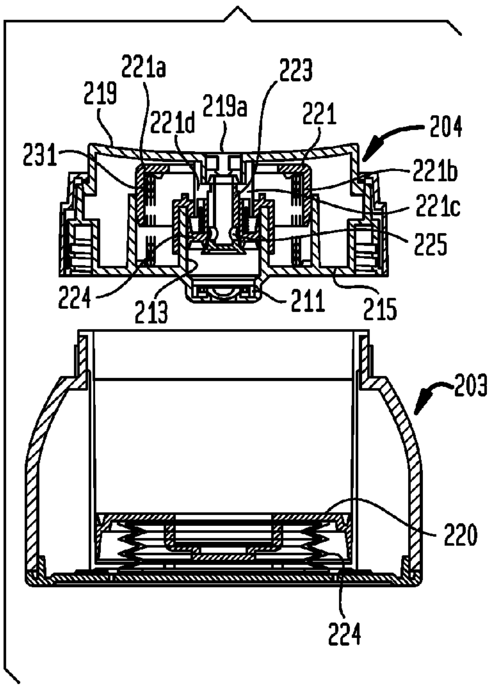
FIG. 7B is a partial, exploded, elevational view of a portion of the airless pump dispenser shown in FIG. 9.

Turning to FIGS. 7A and 7B, yet another embodiment of the airless pump dispenser of the present invention is shown, in the case in the form of an arcuate-shaped applicator. The container 203 in this case once again includes a bellows member 224 below the movable piston 220 in the bottom of the container 203 before use and during shipment thereof. The airless pump 204 is mounted in a pump housing 215 which can be attached to the upper open end of the container 203 by screw threads or other such means. The cylinder 213 again includes a lower end with a one-way valve 211, and a pump piston 223 mounted for reciprocal movement in the cylinder 213. In this case, a separate stem is unnecessary in view of the distances involved. At the lower end of the pump piston 223 once again passageway 225 is located horizontally and normally covered by sealing member 224. However, upon placement of pressure on the arcuate surface 219, including a central opening 219*a* for the fluid therein, the pump piston 123 is activated. An actuator 221 is rigidly attached to the pump piston 223 and reciprocates therewith. The actuator 221 includes an upper surface 221*a* proximate to the arcuate surface 219. This upper surface 221*a* includes an outer downwardly extending surface 221*b* on its outer end, and an inner downwardly extending surface 221*c*. This inner downwardly extending surface 221*c* includes a flange 221*d* which rigidly engages the outer surface of the pump piston 223. When the arcuate surface 219 is thus urged downwardly, it acts upon the actuator 221, which pushes the pump piston 223 downwardly, exposing the horizontal openings 225 to the interior of the cylinder 213, keeping the valve 211 closed, and causing the pressurized fluid to move upwardly through the pump piston 223 into the opening 219*a* onto the arcuate surface 219. Once again, a spring member 231 is attached to the actuator 221 and the lower face of the pump housing 215 for return reciprocal movement of the actuator 221 and the pump piston 223 upwardly to again seal the openings 225, create a vacuum in the cylinder 213, open the one-way valve 211, and draw fluid from the container 203 upwardly into the cylinder 213 for refilling purposes. Once again, this in turn causes the movable piston 220 to move upwardly within the container 203.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An airless pump dispenser for a fluid comprising a housing having a top and a bottom, an airless pump mounted in an upper portion of said housing, a movable piston having a top and a bottom mounted for movement within said housing from a starting position proximate to said bottom of said housing, thereby defining a dispensing space filled with said fluid between said movable piston in the starting position and said airless pump, and an end position proximate to said airless pump, a dispenser at said top of said housing for receiving said fluid from said airless pump and dispensing said fluid from said housing, and a spring member having a fully expanded position, and being disposed at said bottom of said housing, affixed to either said bottom of said movable piston or to said bottom of said housing, but not to both, said starting position proximate to said bottom of said housing being spaced from said bottom of said housing by said spring member in said fully expanded position whereby a space is provided to account for expansion within said housing filled with said fluid, to accommodate expansion of said fluid within said dispensing space when said dispensing space is full, said spring member having a sufficient driving force to return said movable piston to said starting position after accommodation of said expansion of said fluid within said housing, and having an insufficient driving force to independently move said movable piston within said dispensing space when said dispensing space is filled with fluid.

2. The airless pump dispenser of claim 1 wherein said spring member comprises a helically coiled spring.

3. The airless pump dispenser of claim 1 wherein said spring member comprises an accordion bellows.

4. The airless pump dispenser of claim 1 wherein said spring member is affixed to said bottom of said housing.

5. The airless pump dispenser of claim 1 wherein said spring member is affixed to said movable piston.

6. The airless pump dispenser of claim 5 including a return spring disposed about said pump piston for returning said pump piston from said dispensing position to said initial rest position.

7. The airless pump dispenser of claim 1 wherein said movable piston includes sealing means for airtight sealing with said inner surface of said housing.

8. The airless pump dispenser of claim 1 wherein said dispenser comprises a movable exit housing including a fluid exit for dispensing said fluid, said airless pump comprising an inlet for fluid connection to said housing containing said fluid, a one-way valve controlling the flow of said fluid from said housing through said inlet, a pump housing, a pump cylinder mounted within said pump housing, a pump piston slidably mounted within said pump cylinder for slidable movement between an initial rest position and a dispensing position, said pump piston including an inner conduit for said fluid connected to said fluid exit in said movable exit housing, whereby upon movement of said pump piston from said initial rest position to said dispensing position said fluid is dispensed through said inner conduit to said fluid exit in said movable exit housing, and upon return movement of said pump piston from said dispensing position to said initial rest position, a vacuum is created to drawn said fluid from said dispensing space through said one-way valve.

9. The airless pump dispenser of claim 8 wherein said pump piston includes at least one opening at the lower end of said pump piston, whereby said at least one opening is closed when said pump piston is in said initial rest position and is open when said pump piston is in said dispensing position, whereby said fluid can flow through said at least one opening into said inner conduit of said pump piston.

10. The airless pump dispenser of claim 9 including a sealing flap attached to said pump cylinder covering said at least one opening when said pump piston is in said initial rest position and uncovering said at least opening when said pump piston is in said dispensing position.

11. The airless pump dispenser of claim 8 wherein said pump piston comprises a lower pump piston portion and an upper stem portion surrounding said lower pump piston portion, both of said lower pump piston portion and said upper stem portion including said inner conduit.

12. The airless pump dispenser of claim 8 wherein said movable exit housing comprises a depressible cap and said fluid exit comprises a nozzle in said depressible cap.

13. The airless pump dispenser of claim 8 wherein said movable exit housing comprises an arcuate surface and said fluid exit comprises an opening in said arcuate surface.

14. The airless pump dispenser of claim 8 wherein said movable exit housing comprises a rotary ball having a predetermined diameter and a rotary ball housing including an opening having a diameter less than said predetermined diameter for retaining said rotary ball therein, and said fluid exit comprises the interface between said rotary ball and said rotary ball housing.

15. The airless pump dispenser of claim 1 wherein said movable piston includes an upper surface and a lower surface, said lower surface of said movable piston being in contact with said spring member and said upper surface of said movable piston including an inner central depressed area whereby said inlet of said airless pump can be disposed in said inner depressed area.

* * * * *